United States Patent
Patel et al.

(10) Patent No.: US 11,665,175 B2
(45) Date of Patent: May 30, 2023

(54) TIME AND LOCATION CONTROLLED CENTRALIZED ACCESS MANAGEMENT SYSTEM

(71) Applicant: JPMorgan Chase Bank, N.A., New York, NY (US)

(72) Inventors: Dilip Patel, Powell, OH (US); Christopher D. Bain, Westerville, OH (US); Levent Talgar, Dublin, OH (US); Braden D. Peters, Dublin, OH (US); Ramana Malakalapalli, New Albany, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/465,219

(22) Filed: Sep. 2, 2021

(65) Prior Publication Data
US 2021/0400052 A1 Dec. 23, 2021

Related U.S. Application Data

(63) Continuation of application No. 16/219,402, filed on Dec. 13, 2018, now Pat. No. 11,140,174.
(Continued)

(51) Int. Cl.
*H04L 9/40* (2022.01)
*G06F 21/62* (2013.01)
(Continued)

(52) U.S. Cl.
CPC ............ *H04L 63/105* (2013.01); *G06F 21/45* (2013.01); *G06F 21/604* (2013.01); *G06F 21/6218* (2013.01); *G06Q 10/063114* (2013.01); *G06Q 10/105* (2013.01); *H04L 63/0428* (2013.01); *H04L 63/083* (2013.01); *H04L 63/102* (2013.01); *H04L 63/107* (2013.01);
(Continued)

(58) Field of Classification Search
CPC . H04L 63/105; H04L 63/0428; H04L 63/083; H04L 63/102; H04L 63/107; H04L 63/101; H04L 63/108; G06F 21/45; G06F 21/604; G06F 21/6218; G06F 2221/2111; G06F 2221/2141; G06Q 10/063114; G06Q 10/105
See application file for complete search history.

(56) References Cited

U.S. PATENT DOCUMENTS 5,459,657 A 10/1995 Wynn
6,049,776 A 4/2000 Donnelly
(Continued)

FOREIGN PATENT DOCUMENTS

| CN | 107025537 A | * | 8/2017 | ........... G06Q 10/105 |
| WO | WO-2013000128 A1 | * | 1/2013 | ............... G07C 1/10 |
| WO | WO-2016086315 A1 | * | 6/2016 | ............... G07C 9/00 |

*Primary Examiner* — Shahriar Zarrineh
(74) *Attorney, Agent, or Firm* — Greenblum & Bernstein, P.L.C.

(57) ABSTRACT

A system for and method of automatically providing access credentials to employees based upon the time and location of the employee when the request was made are provided. The system and method also control the provision of access credentials to an employee by using the employment status and role of the employee to determine whether the employee is authorized to receive the requested access credentials.

16 Claims, 4 Drawing Sheets

Related U.S. Application Data

(60) Provisional application No. 62/598,202, filed on Dec. 13, 2017.

(51) Int. Cl.
*G06F 21/60* (2013.01)
*G06Q 10/0631* (2023.01)
*G06Q 10/105* (2023.01)
*G06F 21/45* (2013.01)

(52) U.S. Cl.
CPC ............... *G06F 2221/2111* (2013.01); *G06F 2221/2141* (2013.01)

(56) References Cited

U.S. PATENT DOCUMENTS

| | | | |
|---|---|---|---|
| 7,107,322 B1 | 9/2006 | Freeny, Jr. | |
| 7,664,481 B2 | 2/2010 | Braunstein | |
| 7,847,675 B1 | 12/2010 | Thyen | |
| 7,979,802 B1 | 7/2011 | Appelman | |
| 8,108,914 B2 | 1/2012 | Hernoud | |
| 8,271,531 B2 | 9/2012 | Karlsen | |
| 8,359,221 B2 | 1/2013 | Gala | |
| 8,788,308 B1 | 7/2014 | Cox | |
| 8,799,243 B1 | 8/2014 | Havlik | |
| 8,869,053 B2 | 10/2014 | Ehrler | |
| 8,942,727 B1 | 1/2015 | Roman | |
| 9,020,848 B1 | 4/2015 | Ridge | |
| 9,300,646 B1* | 3/2016 | Saylor | H04W 4/029 |
| 9,374,363 B1 | 6/2016 | Paczkowski | |
| 9,805,342 B2 | 10/2017 | Dickerson | |
| 9,842,313 B2 | 12/2017 | B'Far | |
| 9,953,303 B2* | 4/2018 | Cherry | G07C 1/10 |
| 9,955,318 B1 | 4/2018 | Scheper | |
| 10,147,058 B1* | 12/2018 | Ouimette | G06Q 10/06398 |
| 10,237,256 B1 | 3/2019 | Pena | |
| 10,367,911 B1 | 7/2019 | Combs | |
| 10,657,499 B1* | 5/2020 | Cherry | G06Q 10/1091 |
| 10,832,189 B2 | 11/2020 | Gupta | |
| 10,963,586 B1 | 3/2021 | Sculley | |
| 11,068,814 B2* | 7/2021 | Clifford | G07C 1/10 |
| 2002/0123921 A1* | 9/2002 | Frazier | G06Q 10/063112 705/7.14 |
| 2002/0198758 A1 | 12/2002 | Sawa | |
| 2003/0004736 A1 | 1/2003 | Calderaro | |
| 2003/0041085 A1 | 2/2003 | Sato | |
| 2004/0019542 A1* | 1/2004 | Fuchs | G07C 1/14 705/32 |
| 2005/0137927 A1 | 6/2005 | Jura | |
| 2005/0182698 A1* | 8/2005 | Garcia | G06Q 40/12 705/30 |
| 2006/0064313 A1 | 3/2006 | Steinbarth | |
| 2006/0075488 A1* | 4/2006 | Barrett | G06F 21/6227 726/22 |
| 2006/0224477 A1* | 10/2006 | Garcia | G06Q 20/10 705/32 |
| 2007/0067200 A1 | 3/2007 | Patel | |
| 2007/0130294 A1 | 6/2007 | Nishio | |
| 2007/0198432 A1 | 8/2007 | Pitroda | |
| 2007/0271339 A1* | 11/2007 | Katz | G16H 40/20 709/204 |
| 2008/0095339 A1 | 4/2008 | Elliott | |
| 2008/0163347 A1* | 7/2008 | Ratcliff | G06F 21/6227 726/6 |
| 2008/0262877 A1* | 10/2008 | Hargroder | G06Q 40/08 705/4 |
| 2009/0086936 A1 | 4/2009 | Clifford | |
| 2009/0125346 A1 | 5/2009 | Loconzolo | |
| 2009/0177688 A1* | 7/2009 | Karlsen | G06Q 10/06 |
| 2009/0265105 A1* | 10/2009 | Davis | G07F 17/32 348/113 |
| 2010/0250497 A1 | 9/2010 | Redlich | |
| 2010/0312606 A1 | 12/2010 | Gala | |
| 2011/0093913 A1 | 4/2011 | Wohlert | |
| 2011/0320230 A1 | 12/2011 | Podgurny | |
| 2012/0025947 A1* | 2/2012 | Sinha | G07C 9/28 340/5.6 |
| 2012/0089493 A1 | 4/2012 | Podgurny | |
| 2013/0031598 A1 | 1/2013 | Whelan | |
| 2013/0090968 A1* | 4/2013 | Borza | G06Q 10/06 705/7.16 |
| 2013/0246114 A1 | 9/2013 | Gala | |
| 2013/0325495 A1 | 12/2013 | Hempstead | |
| 2014/0067499 A1 | 3/2014 | Stepanovich | |
| 2014/0114824 A1 | 4/2014 | Kong | |
| 2015/0025929 A1 | 1/2015 | Abboud | |
| 2015/0206082 A1* | 7/2015 | Sarvepalle | G06Q 40/02 705/7.17 |
| 2015/0220883 A1 | 8/2015 | B'Far | |
| 2015/0262112 A1 | 9/2015 | Raanan | |
| 2015/0271208 A1* | 9/2015 | Gallant | H04L 9/3247 726/1 |
| 2015/0341375 A1 | 11/2015 | Bauer | |
| 2015/0356493 A1 | 12/2015 | Skujins | |
| 2015/0356496 A1 | 12/2015 | Bartholomew | |
| 2016/0035009 A1 | 2/2016 | Khrawish | |
| 2016/0088430 A1* | 3/2016 | Connor | H04W 4/02 455/456.1 |
| 2016/0110412 A1 | 4/2016 | Sun | |
| 2016/0125197 A1* | 5/2016 | Winters | G06F 21/6227 707/783 |
| 2016/0180295 A1 | 6/2016 | Smith | |
| 2016/0275439 A1 | 9/2016 | Avats | |
| 2016/0300178 A1 | 10/2016 | Perry | |
| 2017/0039524 A1 | 2/2017 | Avats | |
| 2017/0124836 A1 | 5/2017 | Chung | |
| 2017/0193719 A1 | 7/2017 | Haci | |
| 2018/0041489 A1* | 2/2018 | Narayanan | H04W 4/80 |
| 2018/0173386 A1 | 6/2018 | Adika | |
| 2019/0147468 A1* | 5/2019 | Elias | G06F 7/026 705/7.34 |

* cited by examiner

TIME AND LOCATION CONTROLLED CENTRALIZED ACCESS MANAGEMENT SYSTEM

CROSS-REFERENCE TO RELATED APPLICATIONS

This application is a continuation of U.S. patent application Ser. No. 16/219,402, filed Dec. 13, 2018, which claims the benefit of U.S. Provisional Application No. 62/598,202, filed Dec. 13, 2017. The entire disclosure of each of the above-identified applications, including the specification, drawings, and claims, is incorporated herein by reference in its entirely.

FIELD

The present disclosure generally relates to systems and methods for controlling access to critical locations and systems using employee characteristics such as employment status, normal work location, and normal work times to determine whether the access is authorized.

BACKGROUND

Many businesses or organizations are tasked with managing access to sensitive information, valuable property, or other resources that must be accessible to employees in order for the business or organization to operate. However, not all employees need to have access to all information, property, or resources. Those employees that do need to access the information, property, or resources may not need access all of the time or at all locations. For example, an employee of a bank who works at a first branch may not require access to a second branch. In another example, an employee may not require access to resources outside of their normal working hours. Because of these and other complexities, managing this access is more difficult as the number of employees increases. This task becomes difficult or impossible to perform manually for businesses or organizations with many employees.

Therefore a need exists for systems and methods for controlling access of employees to certain resources.

SUMMARY

In an exemplary embodiment, an access management system is provided. The exemplary access management system comprises: a credential source comprising access credentials; an employee records source comprising employee information; a work schedule source comprising work schedule information; an access control repository configured to: receive access credentials from the credential source; receive employee information from the employee records source; receive work schedule information from the work schedule source; an access application configured to generate an access credentials request and transmit the request to the access control repository, wherein, upon receiving the request, the access control repository is further configured to transmit the access credentials to the access application based on the access credentials request, the employee information, and the work schedule information.

In other exemplary embodiment, a computer implemented method for managing access credentials for secure systems and resources is provided. The exemplary method comprising: receiving an access credentials request from an access application associated with an employee; receiving access credentials associated with the employee from a credential source; receiving employee information associated with the employee from an employee records source; receiving work schedule information associated with the employee from a work schedule source; and determining if the employee is authorized to access the secure systems and resources based on access the credentials request, access credentials, employee information, and work schedule information.

In yet another exemplary embodiment, a computer implemented method for managing access credentials for secure systems and resources is provided. The exemplary method comprising: receiving an access credentials request from an access application associated with an employee; receiving access credentials associated with the employee from a credential source; receiving employee information associated with the employee from an employee records source, wherein the employee information includes a job role; receiving work schedule information associated with the employee from a work schedule source; determining if the employee is not authorized to access the secure systems and resources based on access the credentials request, access credentials, and work schedule information; overriding the determination that the employee is not authorized to access the secure systems and resources, based on the employee job role; and, transmitting the access credentials to the access application.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, and is offered for explanation and understanding only.

Figure 1:
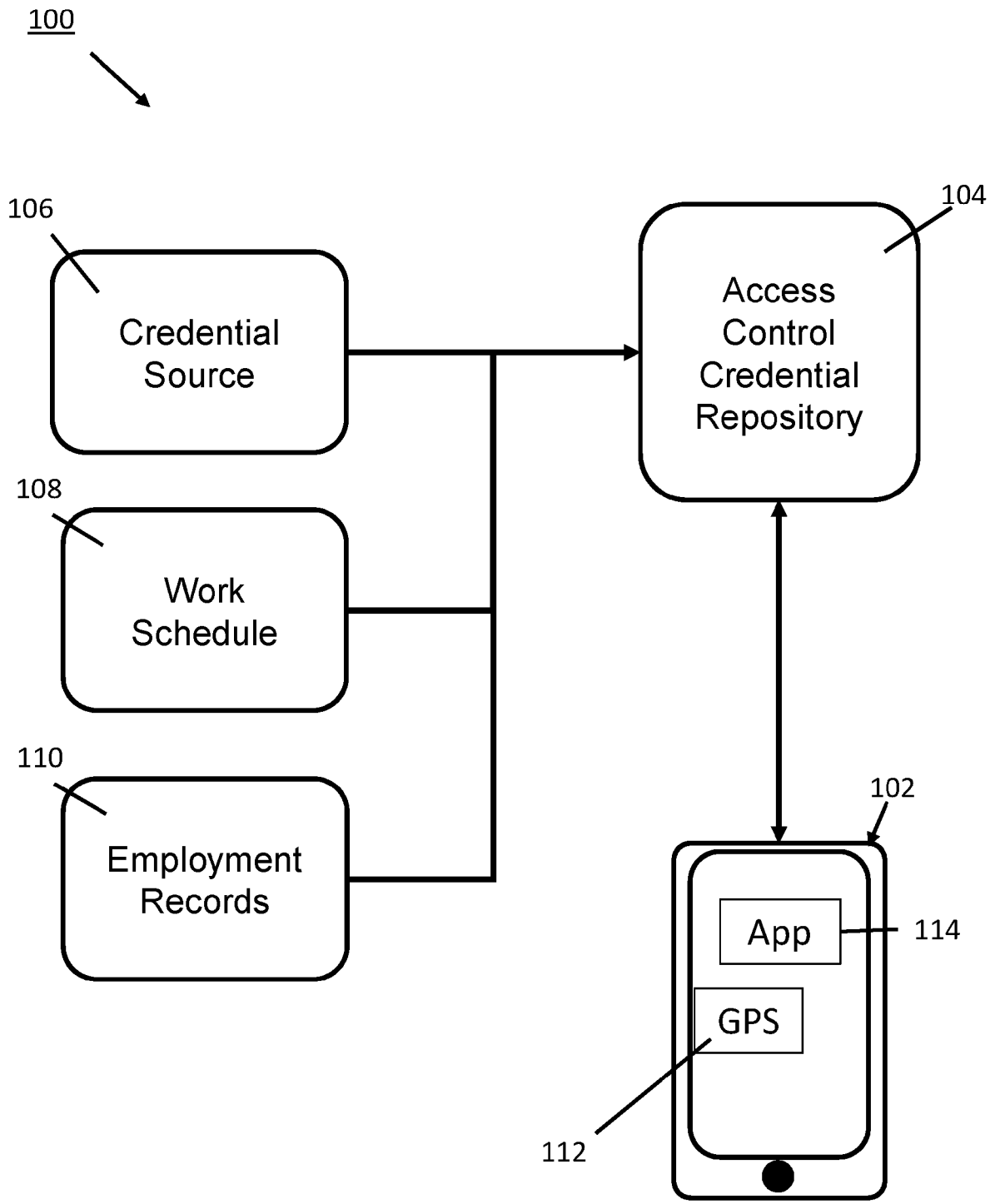
FIG. 1 shows a diagram of an access management system according to an exemplary embodiment.

As is illustrated in FIG. 1, an access management system 100, according to an exemplary embodiment, comprises at least a mobile device 102, an access control credential repository 104, a credential source 106, a work schedule source 108, and an employment records source 110. Mobile device 102 may further comprise a location system such as Global Positioning System (GPS) 112 and an access application 114. The access management system 100 may be operated and maintained by an organization for the dynamic management of employee access to systems and resources of the organization. Mobile device 102 may be a communication device associated with an employee, such as a smartphone. In some embodiments mobile device 102 may be a network connected laptop or tablet computer associated with the employee. In some embodiments, mobile device 102 is configured to communicate with the access control credential repository 104 via an access application 114. The mobile device 102 may further comprise a location services function such as GPS 112 which may be implemented with GPS, Wi-Fi locator, Bluetooth®, or other location technology. It will be appreciated that the access application 114 may be configured to communicate with the other components of the mobile device 102, such as GPS 112. As used herein, functions performable by the mobile device 102 may be also be performable by the access application 114.

In certain embodiments, mobile device 102, and associated access application 114, may be specially configured by an organization to be used with one individual, for example, an employee, for only organization approved work or activity, however, it will be appreciated that mobile device 102 could be a personal device that an employee uses for both work and personal use. While various hardware and software configurations of mobile device 102 are envisioned, mobile device 102 comprises at least a processor in communication with a memory, wherein the processor is operable to execute instructions stored in the memory. It will be appreciated that mobile device 102 may install and execute applications and programs installed from an application server or store.

In an exemplary embodiment, the access control credential repository 104 is a computer server or database in communication with the mobile device 102 and configured to provide access credentials to the mobile device via the access application 114. The communication between mobile device 102 and the access control credential repository 104 may be accomplished by any network communication over the Internet, intranet, or similar network, i.e. via a cellular carrier network, ethernet connection, or wireless connection. In some embodiments, the mobile device 102 is configured to communicate with the access control credential repository 104 via near field communication, Bluetooth, or similar proximity based communication technologies. In such embodiments, the access control credential repository 104 may be accessible by an access terminal within physical proximity of the mobile device 102. An access terminal may be operable to communicate with the mobile device 102 and establish a connection with the access control credential repository through execution of the access application 114. In some embodiments, access credentials are encrypted before being communicated to the mobile device 102. Encryption of the credentials may be performed by the access control credential repository 104, or by an encryption service or application in communication with the access control credential repository 104. Mobile device 102 may be configured to decrypt credentials via a decryption application installed on the mobile device 102, such as access application 114, or in the alternative, decryption may be performed by a third-party service or application accessed from the mobile device 102. In some embodiments, the access control credential repository 104 is distributed across a plurality of computer servers in communication with each other.

In an exemplary embodiment, the access control credential repository 104 receives access control credentials from a credential source 106. The credential source 106 is a computer server or database configured to generate and/or store access credentials to be used in connection with various locations and systems throughout an organization. The systems and resources throughout an organization may sometimes be generally referred to as assets. In some embodiments, the credential source 106 may be operated and controlled by a person or business unit responsible for issuing credentials for a particular resource or group of resources. Examples of access credentials that may be generated and/or stored at the credential source 106 include, but are not limited to, alphanumeric passwords, access control key codes, number combinations, and the like. In some embodiments, certain types of credentials may be linked to a specific location or system. For instance, more complex credentials may be used to access more secure locations and systems.

Access control credential repository 104 may be further configured to receive employee work schedule data from a work schedule source 108. The work schedule data may indicate both the time and location that an employee is scheduled or assigned to work. Work schedule source 108 may comprise one or more servers or computer databases. In some embodiments work schedule source 108 is configured to communicate with other informational databases within an organization, for instance a payroll or time entry system. It will be appreciated that references to an "employee" herein refer generically to a user who requires access to a resource within an organization. For instance, an independent contractor or consultant hired by the organization may require access to organization resources via the access management system 100 within the scope of their limited employment or relationship to the organization. Thus, "employee" refers generally to any individual who requires access credentials that are provided by the access management system 100 as described herein.

Access control credential repository 104 may be further configured to receive employment data from employment records source 110. The employment records source 110 may comprise information regarding the employment status of the employee. In certain exemplary embodiments, the employment records source 110 may also comprise information that indicates levels of employee authority and responsibility. Level of employee authority may be used to override certain access restrictions. For example, an employee with a high level of authority may be permitted to access a location not normally associated with the employee, whereas an employee with a lower level of authority may be more strictly limited to just the location or locations with which the employee is associated. Similar to work schedule source 108, employment records source 110 may be configured to communicate with other informational databases within an organization, for instance a payroll or time entry system. In certain embodiments, work schedule source 108 and employment records source 110 may be combined in a general employee information database or collection of databases. In some embodiments, access control credential repository 104 may receive and store information from credential source 106, work schedule source 108, and employment records source 110. In such embodiments, access control credential repository 104 may periodically communicate with the sources to fetch or pull updated data for storage at the repository. In other embodiments the control credential repository 104 may stream information from the credential source 106, work schedule source 108, and employment records source 110 to ensure that the most up-to-date data is accessible at the repository 104.

In certain exemplary embodiments, access credentials may be granted in response to an employee access request based on the physical location of the employee and an associated mobile device. In such embodiments, mobile device 102 may be configured to determine location information relating to the employee using GPS 112. Mobile device 102 may then provide the location information to an access control credential repository 104 which can compare the actual location of the employee and mobile device 102 to a predicted location based on employee data from work schedule source 108 and employment records source 110. In some embodiments, mobile device 102 is configured to request access credentials from the access control credential repository 104 via access application 114. Alternatively, employee access is automatically granted based on the location information.

Figure 2:
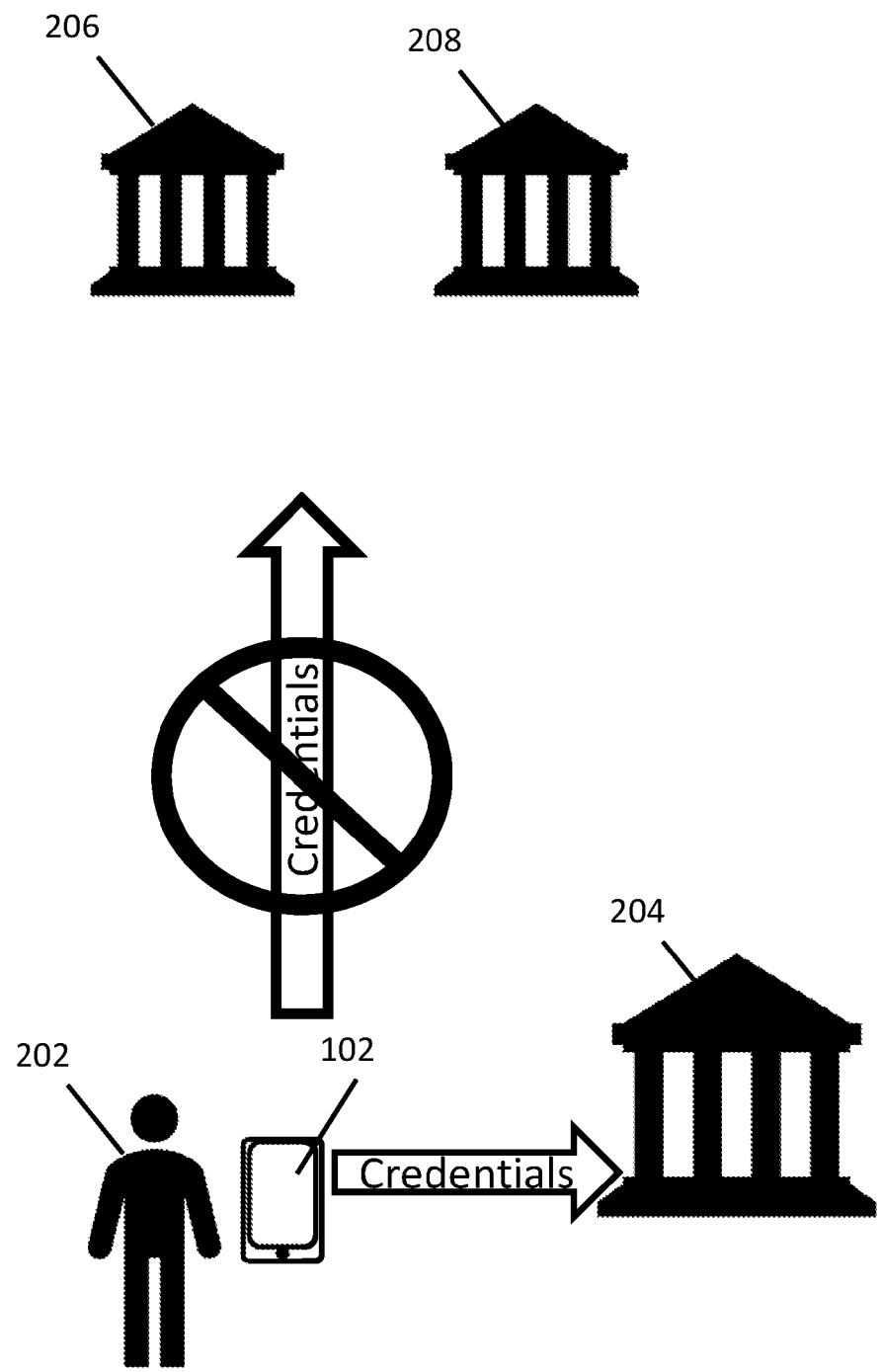
FIG. 2 is a diagram of an employee and various locations for use in describing the system of FIG. 1.

As is illustrated in the diagram 200 of FIG. 2, an employee 202 and an associated mobile device 102 are located in proximity to a first location 204. As illustrated, there is a second location 206 and a third location 208 which are located geographically farther away from the employee 202. These locations 204, 206, 208 may be pre-registered with the access management system 100 or otherwise associated with the employee 202. Pre-registration of an employee may comprise generated or assigned credentials stored in access control credential repository 104. These credentials can be unique to each of the locations 204, 206, 208. In an exemplary embodiment, the GPS 112 of the mobile device 102 determines the location of the employee 202. The access control credential repository 104 may grant the employee 202 access to access credentials that are applicable to the first location 204 in proximity to the employee, but not to the second location 206 or third location 208 remote from the employee. If the employee 202 requests credentials to locations 206 or 208, while still proximate to location 204 their request will be denied. However, in certain situations, employee 202 has authorization to override such location based limitations on access, for instance if they are a manager or executive. Although GPS 112 is illustrated, other methods for determining an employee's location can be used. For example, without limitation, Wi-Fi or cellular tower location methods can be used to determine the location of the mobile device 102.

Similar to the location based authorization illustrated above, an employee 202 may be granted access credentials based on the day or time access credentials are requested. More specifically, access to credentials may limited to times the employee is scheduled to work. For example, if employee 202 is scheduled to work at location 204 from 8 am to 12 pm and location 206 from 1 pm to 5 pm, access credentials may be granted to the employee only during those times. In certain embodiments, an employee 202 may have access credentials revoked automatically when their time and location are no longer consistent with their granted access.

Figure 3:
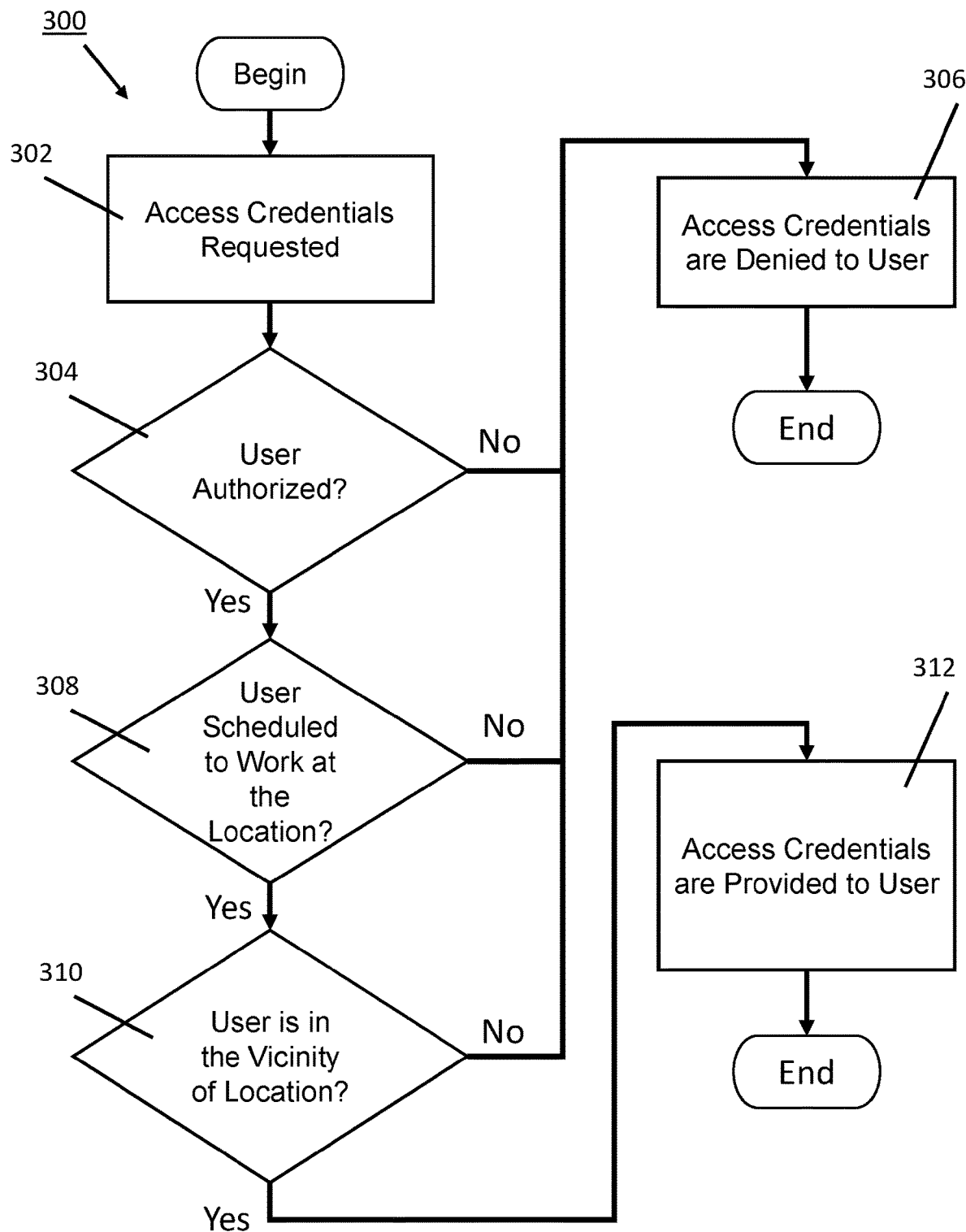
FIG. 3 is a flow chart of the steps taken by an access management method, according to an exemplary embodiment.

FIG. 3 illustrates a flow chart of an access management method 300 according to an exemplary embodiment. As illustrated, at step 302, access credentials are requested. Access credentials may be requested by an employee seeking access to a system or resource requiring credentialed access. An access credential request may be generated by a mobile device executing an access application, such as access application 114. In some embodiments, an access credential request may be generated automatically according to a recognized location of the mobile device. For instance, a user device and associated access application may generate an access request automatically based on the time of day or location of the mobile device. At step 304, the method determines if a user is authorized to access the system or resource. In certain embodiments, a user is authorized if their credentials are recognized as valid credentials, for instance credentials that are generated and/or stored at credentials source 106. This determination may comprise verifying that the employee 202 is still an employee of an organization using employment status data received from the employment records source 110. Determining whether the employee 202 is authorized to receive the requested access credentials may also involve determining whether the employee is employed in a role that grants the employee the necessary authorization. Thus, employment records may be analyzed to determine the current role of employee 202 in the organization and then to determine if the requested access credential is required by the determined role. Additionally, employment records may be analyzed to determine if the employee role is associated with any location override privileges, as previously discussed. If the employee 202 is not authorized, the requested access credentials are denied in step 306.

At step 308, the time and day that the employee 202 requests the access credentials are compared to schedule information received by the access control credential repository 104. If the received schedule information indicates that the employee 202 is not scheduled to be working at the time of the request, the access credential request is denied in step 306. In some exemplary embodiments, the schedule information may also be used to determine the location at which the employee 202 is scheduled to work. In some exemplary embodiments, this information is compared to the location for which the access credential is requested. If the employee 202 is not scheduled to work at the requested location 308, the access credential request is denied in step 306. As is shown in FIG. 2, in some exemplary embodiments, the physical location of the employee 202 is determined by a GPS component 112 of the mobile device 102. In such embodiments, if it is determined in step 310 that the employee 202 is not located in the vicinity of the location for which the access credential is requested in step 302, the employee is denied the requested access credential in step 306. In certain embodiments, upon denial of credentials at step 306, a notification is generated and sent to the mobile device to alert the employee that their access credential request has been denied. A notification may also be sent to the organization or business unit for which the credentials were assigned in order to alert of an unauthorized credential request.

If the employee 202 satisfies the requirements of steps 304, 308, and 310, the requested access credentials are provided to the employee in step 312. In some exemplary embodiments, after credentials are supplied to the employee 202, limitations may be placed on that access. For example, the access application 114 may configure the mobile device 102 such that copy and paste operations are prevented. This serves to further protect the security of the provided access credentials. As an additional security measure, credentials provided at step 312 may be automatically revoked if the location of mobile device moves outside of an authorized location. In certain embodiments, access to the credentials may be limited to a pre-defined timeframe, for example 1 hour, until a new access credential request must be issued.

In some exemplary embodiments, the access control credential repository 104 may provide the access credentials applicable to the mobile device 102 of an employee 202 without regard to the location or work status of the employee. In such embodiments, the mobile device 102 comprises an access application 114 which receives the access credentials from the access control credential repository 104. The access credentials may be encrypted such that the access application 114 is required to decrypt the access credentials before they are available to an employee 202. The access application 114 also receives work schedules and employment record information from the repository of access control credentials 104. When the access application 114 receives a request for access credentials from the employee 202, the access application compares requested credentials and associated locations to the received work schedules and employment records. The access application 114 then performs the decisions illustrated in steps 304, 308, and 310 of FIG. 3. The result is a grant or denial of access credentials according to the results of the decisions performed in these steps. Thus, if the employee 202 satisfies the decision criteria of steps 304, 308, and 310, the access application 114 decrypts the requested access credential and provides the decrypted credential to the employee.

Figure 4:
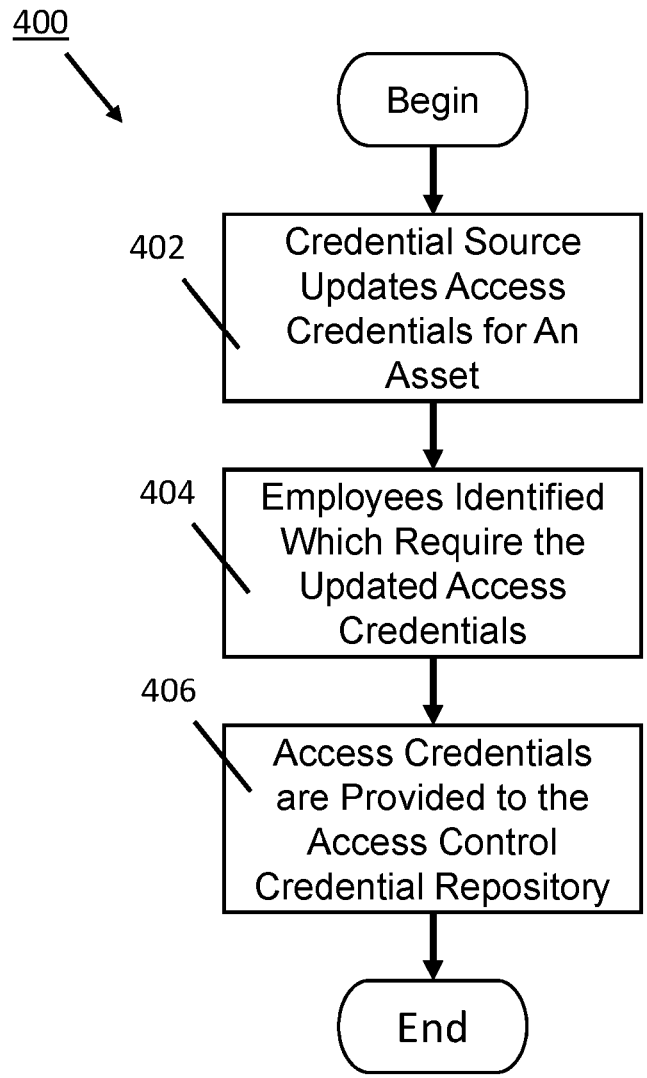
FIG. 4 is a flow chart of the steps taken by the access management system of FIG. 1 to update the access credentials maintained in a credentials database, according to an exemplary embodiment.

In some embodiments, access control credential repository 104, which receives access control credentials from one or more credential sources 106, is configured to perform dynamic updating of access control credentials. In some embodiments, the credential source(s) provide updates to the access control credential repository 104. Access control credential repository 104 can distribute these credentials to a plurality of mobile devices, such as mobile device 102 belonging to employees 202, via access application 114. Thus, credentials can be updated as needed and automatically provided to an employee or groups of employees. This process 400 for updating access credentials is shown in FIG. 4. As illustrated, a credential source 106 can update an access credential for an asset in step 402. The employees 202 which require the updated access credentials are identified in step 404. In some exemplary embodiments, this identification can be performed automatically by the access control credential repository 104. In such embodiments, the access control credential repository 104 can identify the employees who have received the access credential prior to the update and provides the updated credential to those employees whose current credentials are out of date. In other exemplary embodiments, the credential source 106 may identify the employees who are to receive the updated access credentials. The updated access credentials are provided to the access control credential repository 104 in step 406. Thus, the access control credential repository 104 maintains a record of up-to-date access credentials which are then distributed to various employees as needed and authorized.

While the present disclosure and associated concepts have been illustrated by the description of various embodiments thereof, and while these embodiments have been described in considerable detail, it is not the intention of the Applicant to restrict or in any way limit the scope of the disclosure to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general concepts described and enabled herein.

What is claimed is:

1. An access management system comprising:
an access control repository configured to:
receive access credentials from a credential source;
receive employee information from an employee records source;
receive work schedule information from a work schedule source; and
a mobile device associated with an access application specially configured by an organization to be used by an employee that generates an access credentials request and transmits the request to the access control repository,
wherein the access control repository is a computer server,
wherein, upon receiving the request, the access control repository transmits the access credentials to the access application based on the access credentials request, the employee information, the work schedule information, and a comparison of an actual location of the employee with a predicted location of the employee,
wherein the predicted location of the employee is based on a time and a location that an employee is scheduled to work,
wherein the credential source within the mobile device receives and stores user credentials assigned to an employee based on his/her job role information, wherein the job role information is utilized to determine whether the employee has overriding authorization for overriding a denied access,
wherein the access credential request is generated automatically according to a recognized location,
wherein the credentials are unique to each of the locations and the access control repository grants the employee access to access credentials that are applicable to a first location in proximity to the employee, but not to other locations remote from the employee,
wherein, when the employee requests credentials to the other locations, while still proximate to the first location, the request is denied based on determining that the employee's job role does not provide overriding authorization, and
wherein, when the employee requests credentials to the other locations, while still proximate to the first location, the request is granted based on determining that the employee's job role provides overriding authorization,
wherein the access control repository periodically communicates with the credential source, the employee records source, and the work schedule source to fetch or pull updated data for storage at the access control repository, and
wherein access credentials are revoked based on a comparison of the actual location of the employee with the predicted location of the employee when it is determined that the employee does not have overriding authorization.

2. The system of claim 1, wherein the employee records source includes information data that indicates level of the employee's authority and responsibility.

3. The system of claim 1, wherein the level of the employee's authority is used to override certain access restrictions.

4. The system of claim 1, wherein the employee records source is configured to communicate with a payroll or time entry system within an organization.

5. The system of claim 1, wherein the access control repository is configured to stream information from the credential source, the employee records source, and the work schedule source.

6. The system of claim 1, wherein the access control repository is configured to encrypt the access credentials prior to transmitting to the access application.

7. The system of claim 1, wherein the access application is configured to decrypt the encrypted access credentials via a decryption application.

8. The system of claim 1, wherein the access credentials that are generated and stored at the credential source include one or more of the following: alphanumeric passwords, access control key codes, and number combinations.

9. A computer implemented method for managing access credentials for secure systems and resources, the method comprising:
- receiving an access credentials request from a mobile device associated with an access application specially configured by an organization to be used by an employee;
- receiving access credentials associated with the employee from a credential source within the mobile device;
- receiving employee information associated with the employee from an employee records source;
- receiving work schedule information associated with the employee from a work schedule source;
- determining if the employee is authorized to access the secure systems and resources based on access the credentials request, access credentials, employee information, and work schedule information;
- transmitting the access credentials to the access application based on a comparison of an actual location of the employee with a predicted location of the employee, wherein the predicted location of the employee is based on a time and a location that an employee is scheduled to work;
- receiving and storing user credentials assigned to an employee based on his/her job role information, wherein the job role information is utilized to determine whether the employee has overriding authorization for overriding a denied access;
- wherein the access credential request is generated automatically according to a recognized location,
- wherein the credentials are unique to each of the locations and the method further comprising granting the employee access to access credentials that are applicable to a first location in proximity to the employee, but not to other locations remote from the employee,
- wherein, when the employee requests credentials to the other locations, while still proximate to the first location, denying the request based on determining that the employee's job role does not provide overriding authorization, and
- wherein, when the employee requests credentials to the other locations, while still proximate to the first location, the request is granted based on determining that the employee's job role provides overriding authorization,
- periodically communicating with the credential source, the employee records source, and the work schedule source to fetch or pull updated data for storage at the access control credential repository; and
- revoking the access credentials based on the employee work schedule information when it is determined that the employee does not have overriding authorization.

10. The method of claim 9, wherein the employee records source includes information data that indicates level of the employee's authority and responsibility.

11. The method of claim 9, further comprising:
utilizing the level of the employee's authority to override certain access restrictions.

12. The method of claim 9, further comprising:
communicating, by utilizing the employee records source, with a payroll or time entry system within an organization.

13. The method of claim 9, further comprising:
streaming information from the credential source, the employee records source, and the work schedule source.

14. The method of claim 9, encrypting the access credentials prior to transmitting to the access application.

15. The method of claim 9, decrypting the encrypted access credentials via a decryption application.

16. The method of claim 9, wherein the access credentials that are generated and stored at the credential source include one or more of the following: alphanumeric passwords, access control key codes, and number combinations.

* * * * *